No. 727,202.

PATENTED MAY 5, 1903.

F. H. RICHARDS.
PLAYING BALL.
APPLICATION FILED OCT. 18, 1902.

NO MODEL.

Witnesses
Herbert J. Smith
Calderino C. Fiss

Inventor:
F. H. Richards.

No. 727,202. Patented May 5, 1903.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 727,202, dated May 5, 1903.

Application filed October 18, 1902. Serial No. 127,826. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention, relating to playing-balls, and especially to those adapted for purposes of golf, has for its object to produce a ball possessing phenomenal flying power under a quick sharp blow, while also being specially adapted for the "putting" and "approach" blows, and a further object is to employ cheap material for attaining such efficiency.

Figure 1:
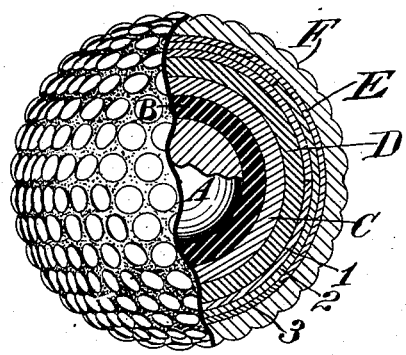
Figure 2:
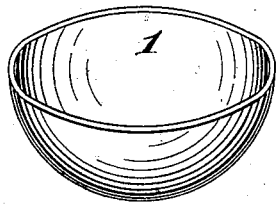

Forming part of this specification are drawings which show one form of the present invention, Figure 1 illustrating a completed ball partly broken away to show its construction, and Fig. 2 perspectively illustrating one of the layers or cups used in building up the filling.

The center piece A, which may be of any suitable hard material—such as wood, celluloid, gutta-percha, or metal—is in the present instance incased in a soft elastic layer B, preferably of soft rubber or other plastic material, upon which is applied a layer C, of hard fibrous material—such, for instance, as hard leather or hide. To this structure is applied another layer D, of fibrous material—such, for instance, as leather—which preferably is of a softer and more pliable nature. To complete the filling, a plurality of cups 1 2 3, preferably of fibrous material, such as leather, which are applied to said layer D in miscellaneous directions, so that the joints between said cups will be staggering with relation to each other. These cups or layers may be of less thickness than the layers B and C, so that a number of these may form a thick layer E between the layer D and the shell or cover.

In constructing the layer E the fibrous material of which the leather cups 1 2 3 are formed is of varying qualities. For instance, the cups 1 and 3 are of a hard resilient nature, while the cup 2 is of a softer and more yielding nature, and being in alternation with the hard cups the resilience of the latter is somewhat modified.

The shell F, of gutta-percha, celluloid, or other plastic material, incloses the filling, being preferably applied thereto in segments under heat and pressure and holding the filling under compression.

By alternating the hard and soft leather layers and inserting a soft elastic layer B between them and the hard center piece a ball is produced which has excellent flying power under a hard blow, while being dead under a light blow. It will also be seen that this structure can be built up of very cheap material, thus producing a ball at a low cost, while at the same time giving to it a high degree of efficiency. It will be further observed that various modifications of material and assemblage may be resorted to within the scope of this invention.

Having thus described my invention, I claim—

1. A playing-ball, a portion whereof comprises layers of hard and soft leather.

2. A playing-ball, a portion whereof comprises layers of hard and springy leather, and intervening layers of soft pliable leather.

3. A playing-ball, a portion whereof comprises layers of hard stiff springy leather and layers of soft pliable leather alternating therewith.

4. A playing-ball comprising a center piece, a shell and layers of hard and soft leather therebetween.

5. A playing-ball comprising a stiff springy center piece, a gutta-percha shell and intervening layers of hard and soft leather.

6. A playing-ball comprising a stiff springy center piece, a gutta-percha shell and intervening layers of hard and soft leather in alternation.

7. A playing-ball comprising a center piece, layers of hard fibrous material, cups of leather, and a shell.

8. A playing-ball comprising a center piece, layers of hard resilient leather, cups of fibrous material and a shell.

9. A playing-ball comprising a center piece, a soft layer, shells of soft and hard fibrous material and a cover.

10. A playing-ball comprising a center piece, a soft-rubber layer, shells of soft and hard fibrous material and a cover.

11. A playing-ball comprising a center piece, a plastic layer, shells of soft pliable and hard resilient leather, and a plastic cover, holding the same under compression.

12. A playing-ball comprising a center piece, a plastic layer, shells of soft pliable and hard resilient leather, and a gutta-percha cover.

13. A playing-ball, a portion whereof comprises superimposed layers of hard and soft fibrous material, one of said layers comprising miscellaneously-applied cups.

14. A playing-ball comprising a hard fibrous center piece, a soft plastic shell thereon, an outer shell of plastic material, and layers of hard and soft leather intervening between said soft plastic layer and plastic shell.

15. A playing-ball comprising a hard center piece, a plurality of shells of fibrous and plastic material thereon, cups of hard and soft fibrous material applied thereto in miscellaneous directions, and a shell of plastic material.

16. A playing-ball comprising a hard center piece, a plurality of shells of soft rubber and fibrous material thereon, cups of fibrous material applied thereto in miscellaneous directions, and a shell of plastic material.

17. A playing-ball comprising a hard center piece, a plurality of shells of fibrous and plastic material thereon, cups of fibrous material applied thereto in miscellaneous directions, and a shell of gutta-percha.

18. A playing-ball comprising a center piece, a layer of soft elastic material thereon, a layer of hard leather inclosing said soft layer, a shell, and intervening layers built up of leather cups.

Signed at Nos. 9 to 15 Murray street, New York, this 17th day of October, 1902.

FRANCIS H. RICHARDS.

Witnesses:
F. W. BARNACLO,
JOHN O. SEIFERT.